C. W. HOWLETT.
COATED FABRIC.
APPLICATION FILED MAY 25, 1918.
1,324,154.
Patented Dec. 9, 1919.
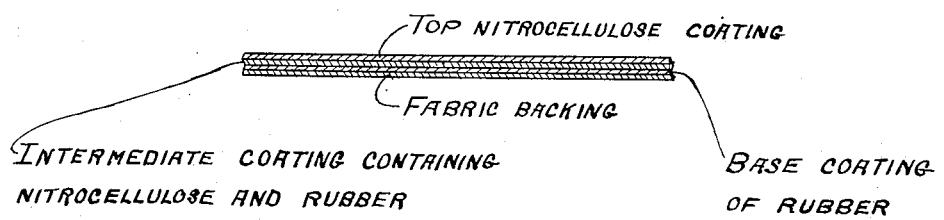
Top nitrocellulose coating
Fabric backing
Intermediate coating containing nitrocellulose and rubber
Base coating of rubber
INVENTOR
Clarence W. Howlett,
BY
Prindle, Wright & Small ATTORNEYS

UNITED STATES PATENT OFFICE.

CLARENCE WEARE HOWLETT, OF KOKOMO, INDIANA, ASSIGNOR TO E. I. DU PONT DE NEMOURS & COMPANY, OF WILMINGTON, DELAWARE, A CORPORATION OF DELAWARE.

COATED FABRIC.

1,324,154.   Specification of Letters Patent.   Patented Dec. 9, 1919.

Application filed May 25, 1918. Serial No. 236,538.

*To all whom it may concern:*

Be it known that I, CLARENCE W. HOWLETT, of Kokomo, in the county of Howard, and in the State of Indiana, have invented a certain new and useful Improvement in Coated Fabrics, and do hereby declare that the following is a full, clear, and exact description thereof.

My invention relates particularly to coated fabrics, that is to say fabrics provided with coatings which may be applied to many different uses and in many different industries.

The object of my invention is to provide coated fabrics having a base coating containing rubber to give a very strong anchorage, and having a surface coating containing nitrocellulose in order to give a gloss to provide the appearance of leather, and to provide a smooth hard surface, both of which coatings are firmly united together.

Another object of my invention is to provide a coated fabric of this character in which between the base and surface coatings there are intermediate coatings having decreasing quantities of rubber and increasing quantities of nitrocellulose as said coatings approach the surface coating.

A further object of my invention is to provide a plurality of coatings for coated fabrics which coatings have therein a common solvent of rubber and nitrocellulose but varying quantities of rubber and nitrocellulose.

Further objects of my invention will appear from the detailed description thereof contained hereinafter.

While my invention is capable of embodiment in many different forms, for the purpose of illustration I shall describe only one form of my invention herein.

The single figure is a cross sectional view of a coated fabric made in accordance with the invention.

For example in carrying out my invention, I may apply to any desired fabric, as for example cloth, an anchorage coating comprising 30 parts rubber
    42 parts benzol
    28 parts ethyl acetate If desired, another coating of the same character may be applied to form a second coating. Upon the top of this coating of rubber there may be applied a series of coatings having decreasing quantities of rubber and increasing quantities of nitrocellulose. The third coating may be comprised of the following:

20.0 parts rubber
    45.3 parts benzol
    30.7 parts ethyl acetate
    4.0 parts nitrocellulose The fourth coating may be as follows:

15.0 parts rubber
    46.7 parts benzol
    32.3 parts ethyl acetate
    6.0 parts nitrocellulose The fifth coating may be comprised of the following:

8.4 parts rubber
    40.25 parts benzol
    27.9 parts ethyl acetate
    13.4 parts castor oil
    3.35 parts drop black
    6.7 parts nitrocellulose The sixth coating may be comprised of:

4.8 parts rubber
    40.0 parts benzol
    27.9 parts ethyl acetate
    15.6 parts castor oil
    3.9 parts drop black
    7.8 parts nitrocellulose The seventh coating may contain the following constituents:

9.2 parts nitrocellulose
    40.0 parts benzol
    27.7 parts ethyl acetate
    18.48 parts castor oil
    4.62 parts drop black The top coating may, if desired, be comprised only of nitrocellulose, and the coating material may comprise the following:

6.4 parts nitrocellulose
    56.2 parts benzol
    37.4 parts ethyl acetate

In all these compositions the parts indicated are parts by weight.

The castor oil is a softening agent and the drop black is a coloring material. It will be noted that in these coating compositions a solvent mixture of benzol and ethyl acetate is used, as this is a solvent of rubber as well as nitrocellulose. Furthermore, although the first coating contains rubber and no nitrocellulose and while the surface coating contains nitrocellulose and no rubber, said coatings are secured together in a much more secure and permanent manner than if said coatings were in contact with one another, by the interposed coatings having decreasing quantities of rubber and increasing quantities of nitrocellulose as they approach the surface. It will be understood also that many other constituents of various different kinds, such as are used in the making of coated fabrics may be introduced into these compositions.

A coated fabric made in this way has exceptionally good anchorage, in fact much better anchorage than if there were merely a nitrocellulose coating adjacent to the fabric, and yet it has in addition the advantages of a coated fabric, the surface coating of which is nitrocellulose.

While I have described my invention above in detail, I wish it to be understood that many changes may be made therein without departing from the spirit thereof.

I claim:

1. A coated fabric comprising a sheet of fabric having a base coating containing rubber and a surface coating containing nitrocellulose.

2. A coated fabric comprising a sheet of fabric having a base coating containing rubber and no nitrocellulose and a surface coating containing nitrocellulose and no rubber.

3. A coated cloth comprising a cloth having a base coating containing rubber and a surface coating containing nitrocellulose.

4. A coated cloth comprising a cloth having a base coating containing rubber and no nitrocellulose and a surface coating containing nitrocellulose and no rubber.

5. A coated fabric comprising a fabric having a base coating containing rubber, a surface coating containing nitrocellulose, and an intermediate coating containing nitrocellulose and rubber.

6. A coated fabric comprising a fabric having a base coating containing rubber and no nitrocellulose, a surface coating containing nitrocellulose and no rubber, and an intermediate coating containing nitrocellulose and rubber.

7. A coated cloth comprising a cloth having a base coating containing rubber, a surface coating containing nitrocellulose, and an intermediate coating containing nitrocellulose and rubber.

8. A coated cloth comprising a cloth having a base coating containing rubber and no nitrocellulose, a surface coating containing nitrocellulose and no rubber, and an intermediate coating containing nitrocellulose and rubber.

9. A coated fabric comprising a fabric having a base coating containing rubber, a surface coating containing nitrocellulose, and a plurality of intermediate coatings containing increasing quantities of nitrocellulose and decreasing quantities of rubber as they approach the surface.

10. A coated fabric comprising a fabric having a base coating containing rubber and no nitrocellulose, a surface coating containing nitrocellulose and no rubber, and a plurality of intermediate coatings containing increasing quantities of nitrocellulose and decreasing quantities of rubber as they approach the surface.

11. A coated cloth comprising a cloth having a base coating containing rubber, a surface coating containing nitrocellulose, and a plurality of intermediate coatings containing increasing quantities of nitrocellulose and decreasing quantities of rubber as they approach the surface.

12. A coated cloth comprising a cloth having a base coating containing rubber and no nitrocellulose, a surface coating containing nitrocellulose and no rubber, and a plurality of intermediate coatings containing increasing quantities of nitrocellulose and decreasing quantities of rubber as they approach the surface.

In testimony that I claim the foregoing I have hereunto set my hand.

CLARENCE WEARE HOWLETT.

Witnesses:
   E. F. NORTON,
   D. L. SPRAHER.